US011800258B2

(12) United States Patent
Bobda et al.

(10) Patent No.: US 11,800,258 B2
(45) Date of Patent: Oct. 24, 2023

(54) HIGH-PERFORMANCE CNN INFERENCE MODEL AT THE PIXEL-PARALLEL CMOS IMAGE SENSOR

(71) Applicant: University of Florida Research Foundation, Incorporated, Gainesville, FL (US)

(72) Inventors: Christophe Bobda, Gainesville, FL (US); Pankaj Bhowmik, Gainesville, FL (US); Md Jubaer Hossain Pantho, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 240 days.

(21) Appl. No.: 17/495,420

(22) Filed: Oct. 6, 2021

(65) Prior Publication Data
US 2022/0124273 A1 Apr. 21, 2022

Related U.S. Application Data

(60) Provisional application No. 63/093,423, filed on Oct. 19, 2020.

(51) Int. Cl.
*H04N 25/79* (2023.01)
*G06N 3/04* (2023.01)
*G06N 5/04* (2023.01)

(52) U.S. Cl.
CPC ............... *H04N 25/79* (2023.01); *G06N 3/04* (2013.01); *G06N 5/04* (2013.01)

(58) Field of Classification Search
CPC .......... G06N 3/04; G06N 3/045; G06N 3/084; G06N 5/04; H04N 25/79
See application file for complete search history.

(56) References Cited

U.S. PATENT DOCUMENTS

| 2019/0278994 | A1* | 9/2019 | Bumpas | G06N 3/045 |
| 2020/0302297 | A1* | 9/2020 | Jaganathan | G06N 3/045 |
| 2021/0089807 | A1* | 3/2021 | Liu | G06V 10/774 |
| 2021/0232873 | A1* | 7/2021 | Kothari | G09B 9/00 |
| 2022/0197306 | A1* | 6/2022 | Cella | G06Q 30/0201 |
| 2022/0398456 | A1* | 12/2022 | Gao | G06V 10/454 |
| 2023/0004749 | A1* | 1/2023 | Jaganathan | G16B 40/20 |

(Continued)

*Primary Examiner* — Antoinette T Spinks
(74) *Attorney, Agent, or Firm* — ALSTON & BIRD LLP

(57) ABSTRACT

Methods and systems are directed to enabling CNN operation close to an image sensor and facilitating CNN inference near the image sensor. The system includes, in part, a digital image sensor and a plurality of processing layers that include, in part, an attention-based preprocessing layer (APL), an inference computation layer (ICL), and a fully connected layer. The digital image sensor can include, in part, a plurality of regions and each region can be processed by region processing units disposed in the APL/ICL in parallel. Each region processing unit disposed in the APL can include, in part, an attention module that determines whether the corresponding region is a relevant region. The region processing units disposed in the APL transmit only relevant data to corresponding region processing units in the ICL and only activate the corresponding region processing units in the ICL for relevant regions. The ICL can include, in part, two convolution layers.

20 Claims, 11 Drawing Sheets

(56) References Cited

U.S. PATENT DOCUMENTS

| | | | |
|---|---|---|---|
| 2023/0091371 A1* | 3/2023 | Ren | G06T 7/10 382/128 |
| 2023/0124495 A1* | 4/2023 | Biswas | G06V 20/41 382/181 |
| 2023/0169140 A1* | 6/2023 | Lee | G06V 10/82 706/31 |

* cited by examiner

# HIGH-PERFORMANCE CNN INFERENCE MODEL AT THE PIXEL-PARALLEL CMOS IMAGE SENSOR

CROSS-REFERENCE TO RELATED APPLICATION

The present application claims benefit under 35 USC 119(e) of U.S. Application Ser. No. 63/093,423, filed Oct. 19, 2020, which is incorporated herein by reference in its entirety.

GOVERNMENT SUPPORT

This invention was made with government support under 1946088 awarded by the National Science Foundation. The government has certain rights in the invention.

TECHNICAL FIELD

The present application relates to a hierarchical architecture for a smart image sensor, and more specifically to a hierarchical architecture for a smart image sensor with CNN-based inference.

BACKGROUND

Significant improvement of the Internet of Things (IoT) with a high image resolution of pixel acquisition has created a data deluge with high redundancy, which worsens the Quality of Service (QoS), data latency, and energy expenditure. The concern is more appealing for computationally expensive operations like convolutional neural networks (CNN) for image classification, object detection, and other fields. The convolutional layers in CNN have a vast amount of computation, which creates a challenge in the hardware and software platform's performance metric. Hence, the end-nodes need to recognize relevant information in the image to reduce the sensor's influx of data. Nevertheless, the sliding-window based traditional sequential operation at any external processor like general-purpose processor (CPU), graphics processing unit (GPU), Field Programmable Gate Array (FPGA) based accelerators does not always suffice time-critical applications with high image resolution while consuming low-power. Here, the initial latency involved in pixel acquisition is expensive for high image resolution. It is a bottleneck even though high-performance accelerators are being employed.

Several approaches are discussed in the literature to bring the computational unit near the sensor and perform pixel-parallel operation. The general approach is integrating a fine-grain processor with the pixel circuit, which does not deteriorate the fill-factor of the pixel circuit. However, with the increase in computational complexity, the fine-grain processor's area increases and subsequently fails the pixel-parallel operation. It motivates the researchers to separate the computational unit and accelerate the application using GPU or other accelerators, and that brings the problems mentioned earlier. Hence, the integration of CNN in the sensor with the per-pixel design is exciting and challenging.

SUMMARY

A digital image capturing and processing system, in accordance with one embodiment of the present disclosure, includes, in part, an image sensor and a plurality of processing layers comprising an attention-based preprocessing layer, at least one inference computation layer, and at least one fully connected layer.

In one embodiment, the image sensor in the digital image capturing and processing system includes, in part, a plurality of regions. Each of the plurality of regions comprises a plurality of pixels, and each of the plurality of pixels is configured to produce a digital pixel value. The digital pixel value represents an intensity of the corresponding pixel in an image.

In one embodiment, the attention-based preprocessing layer in the digital image capturing and processing system includes, in part, a first plurality of region processing units. Each of the first plurality of region processing units is associated with one of the plurality of regions, and configured to determine whether the corresponding region is a relevant region based at least in part on digital pixel values produced by a plurality of pixels in the region. In one embodiment, the first plurality of region processing units in the attention-based preprocessing layer are configured to operate in parallel.

In one embodiment, each of the first plurality of region processing units in the attention-based preprocessing layer of the digital image capturing and processing system includes, in part, a plurality of pixel processing units. Each of the plurality of pixel processing units is associated with a pixel of the image sensor. In one embodiment, each of the first plurality of region processing units further includes, in part, an attention module. The attention module is configured to determine whether a corresponding region is a relevant region based at least in part on values of temporal saliencies and spatial saliencies from a plurality of pixels disposed in the region. In one embodiment, a plurality of pixel processing units associated with the plurality of pixels disposed in the region are configured to determine the values of temporal saliencies and spatial saliencies. In one embodiment, the values of temporal saliencies and spatial saliencies are determined using predictive coding in time and edge detection respectively.

In one embodiment, the at least one inference computation layer in the digital image capturing and processing system includes, in part, a second plurality of region processing units. The second plurality of region processing units are configured to generate a complete feature map of the image.

In one embodiment, the at least one inference computation layer in the digital image capturing and processing system includes, in part, a first convolution layer (FCL) and a second convolution layer (SCL). The FCL comprises a third plurality of region processing units, each of the third plurality of region processing units is associated with one of the plurality of regions, and the third plurality of region processing units are configured to operate in parallel. The SCL comprise a fourth plurality of region processing units, each of the fourth plurality of region processing units is associated with multiple regions of the plurality of regions, and the fourth plurality of region processing units are configured to operate in parallel. In one embodiment, each of the fourth plurality of region processing units is associated with four regions of the plurality of regions.

In one embodiment, an operation of each of the third plurality of region processing units in the FCL is determined based at least in part on whether a region the corresponding region processing unit is associated with is a relevant region. In one embodiment, an operation of each of the fourth plurality of region processing units in the SCL is determined based at least in part on whether at least one of the multiple regions the corresponding region processing unit is associated with is a relevant region.

In one embodiment, the at least one fully connected layer in the digital image capturing and processing system includes, in part, a processing unit, and the processing unit is configured to process the complete feature map of the image.

In one embodiment, a method of digital image capturing and processing includes, in part, generating, by an image sensor, digital pixel values of an image, wherein the image comprises a plurality of regions and each region comprises a plurality of pixel values.

In one embodiment, the method further includes, in part, determining, by a first plurality of region processing units, whether each of the plurality of regions is a relevant region. In one embodiment, each of the first plurality of region processing units is associated with one of the plurality of regions of the image, and configured to determine whether the corresponding region is a relevant region based at least in part on a plurality of pixel values associated with the region. In one embodiment, the first plurality of region processing units are configured to operate in parallel. In one embodiment, each of the first plurality of region processing units comprises a plurality of pixel processing units, wherein each of the plurality of pixel processing units is configured to process one of a plurality of pixel values in a region associated with the corresponding region processing unit. In one embodiment, each of the first plurality of region processing units comprises an attention module. The attention module is configured to determine whether a corresponding region is a relevant region based at least in part on values of temporal saliencies and spatial saliencies from a plurality of pixel values in the region. In one embodiment, a plurality of pixel processing units associated with the corresponding region processing unit are configured to determine the values of temporal saliencies and spatial saliencies in the corresponding region. In one embodiment, the values of temporal saliencies and spatial saliencies are determined using predictive coding in time and edge detection respectively.

In one embodiment, the method further includes, in part, generating, by a second plurality of region processing units, a complete feature map of the image. In one embodiment, the second plurality of region processing units comprises a third plurality of region processing units and a fourth plurality of region processing units. Each of the third plurality of region processing units is associated with one of the plurality of regions, and the third plurality of region processing units are configured to operate in parallel. Each of the fourth plurality of region processing units is associated with multiple regions of the plurality of regions, and the fourth plurality of region processing units are configured to operate in parallel. In one embodiment, each of the fourth plurality of region processing units is associated with four regions of the plurality of regions. In one embodiment, an operation of each of the third plurality of region processing units is determined based at least in part on whether a region the corresponding region processing unit is associated with is a relevant region. In one embodiment, an operation of each of the fourth plurality of region processing units is determined based at least in part on whether at least one of the multiple regions the corresponding region processing unit is associated with is a relevant region.

In one embodiment, the method further includes, in part, processing, by a processing unit, the complete feature map of the image.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

Figure 1:
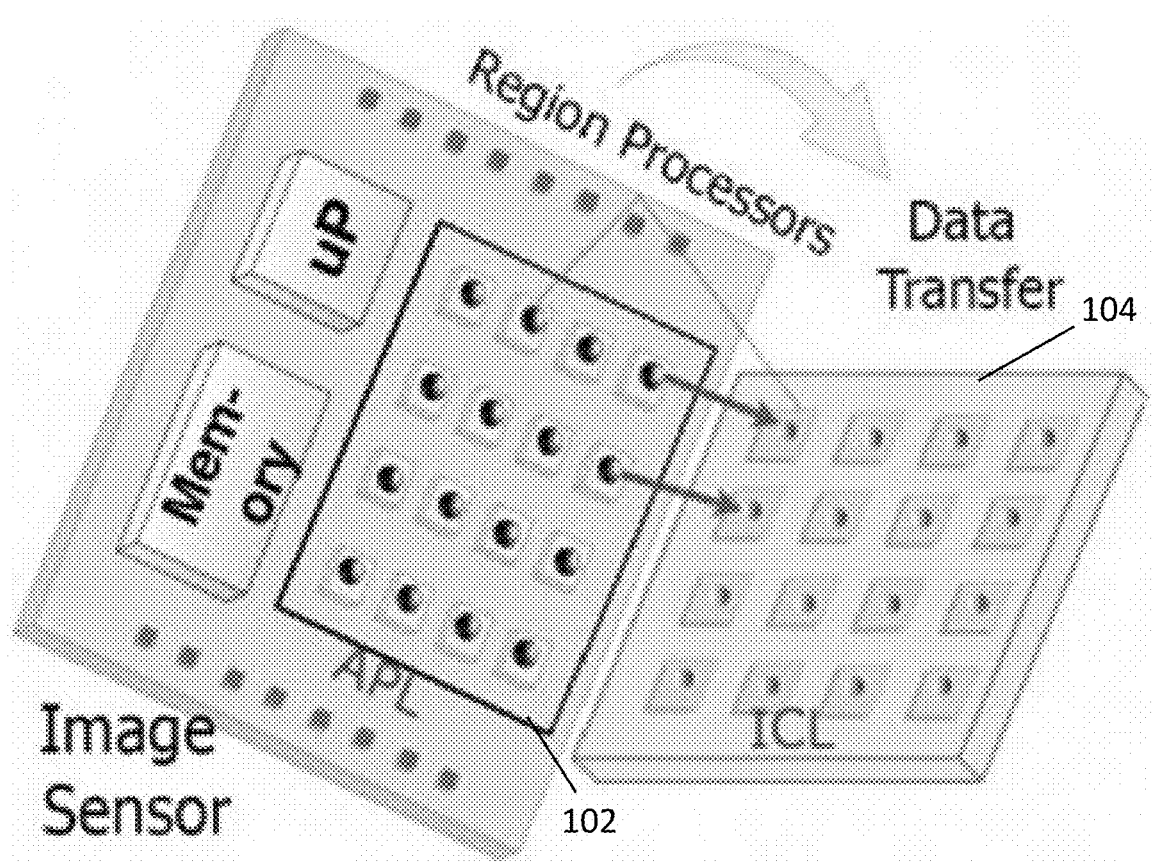
FIG. 1 is a simplified illustration of an exemplary implementation of an image sensor with two computational layers, in accordance with one embodiment of the present disclosure.

In accordance with common practice, some features illustrated in the drawings cannot be drawn to scale. Accordingly, the dimensions of some features can be arbitrarily expanded or reduced for clarity. In addition, some of the drawings cannot depict all the components of a given system, method or device. Finally, like reference numerals can be used to denote like features throughout the specification and figures.

DETAILED DESCRIPTION OF VARIOUS EMBODIMENTS

This disclosure is generally related to a hierarchical architecture for a smart image sensor with CNN-based inference. The hierarchical architecture can be based at least in part on an image sensor that can generate digital pixel values and allow its pixel signals to be processed individually, such as a complementary metal oxide semiconductor (CMOS) image sensor. Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means including but not limited to and should be interpreted in the manner it is typically used in the patent context. The phrases "in one embodiment," "according to one embodiment," and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as "exemplary" or an "example," it should be understood that refers to a non-exclusive example; The terms "about" or "approximately" or the like, when used with a number, may mean that specific number, or alternatively, a range in proximity to the specific number, as understood by persons of skill in the art field.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

Such alterations, modifications, and improvements are intended to be part of this disclosure and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Overview

Convolutional Neural Networks have been adopted in a wide range of vision-based application domains in recent times, due to their success in enabling ubiquitous machine vision and intelligent decisions. However, the overwhelming computation demand of the convolution operations has limited their use in resource-constrained embedded platforms.

Various embodiments of the disclosure generally relate to a system and method for enabling CNN operation close to the image sensor and facilitating attention-oriented CNN inference near the image sensor. The system is based at least in part on an architecture inspired by biological vision systems (BVS). The architecture exploits the BVS to remove the spatio-temporal redundancies and initiate processing with the relevant regions. The relevant regions are processed in a pixel-parallel manner and generate partial data by executing each channel in parallel. The disclosed architecture brings significant speedup in the convolution operations that are typically computationally expensive. The remaining operations of the CNN can be executed on an external processor to complete the CNN inference.

The novelties of the discloser are: (1) a lightweight relevant region detection procedure to enable processing on relevant data only, (2) an event-driven end-to-end CNN computation model that jointly considers algorithm-hardware co-design framework to address computation overheads during training and testing, (3) performing high-level inference computation directly at the image source with massive parallelism before committing readout from the sensor, (4) generating partial data by executing every channel in parallel to keep less memory footprint, and (5) a novel event-based learning mechanism that trains the classifier/detector model only on the relevant data, discarding redundant pixels from the computation pipeline.

Example Apparatus Architecture for Implementing Embodiments of the Present Disclosure Some embodiments of the invention can be explained using a flip-chip image sensor. For example, one part of the sensor can be comprising an array of photosensitive pixel sensors, and the flip part performs the computation (see FIG. 1). However, the scope of this disclose is not limited to the flip-chip. The architecture can be implemented as multi-chip module with the two sides on two separated dies, or as stacked silicon interconnect (SSI) with two dies on the same silicon.

FIG. 1 shows a simplified illustration of an exemplary implementation of an image sensor with two computational layers, in accordance with one embodiment of the present invention. The first one is an Attention-based Preprocessing Layer (APL) 102, which may be merged with pixel circuits of the image sensor, and the second one is an Inference Computation Layer (ICL) 104, which may be vertically integrated with the sensor using the flip-chip IC packaging architecture presented in FIG. 1. There is extensive research in the literature for flip-chip sensor design, pixel-parallel ADC design in image sensors, and efficient offline CNN on microprocessor for video analysis. Various embodiments of the invention extensively explore the sensor-level CNN integration and the methods of obtaining output without convolution operation, utilize maximum bandwidth, and reduce spatio-temporal redundancies, dynamic power consumption, and the number of interconnections.

Figure 2:
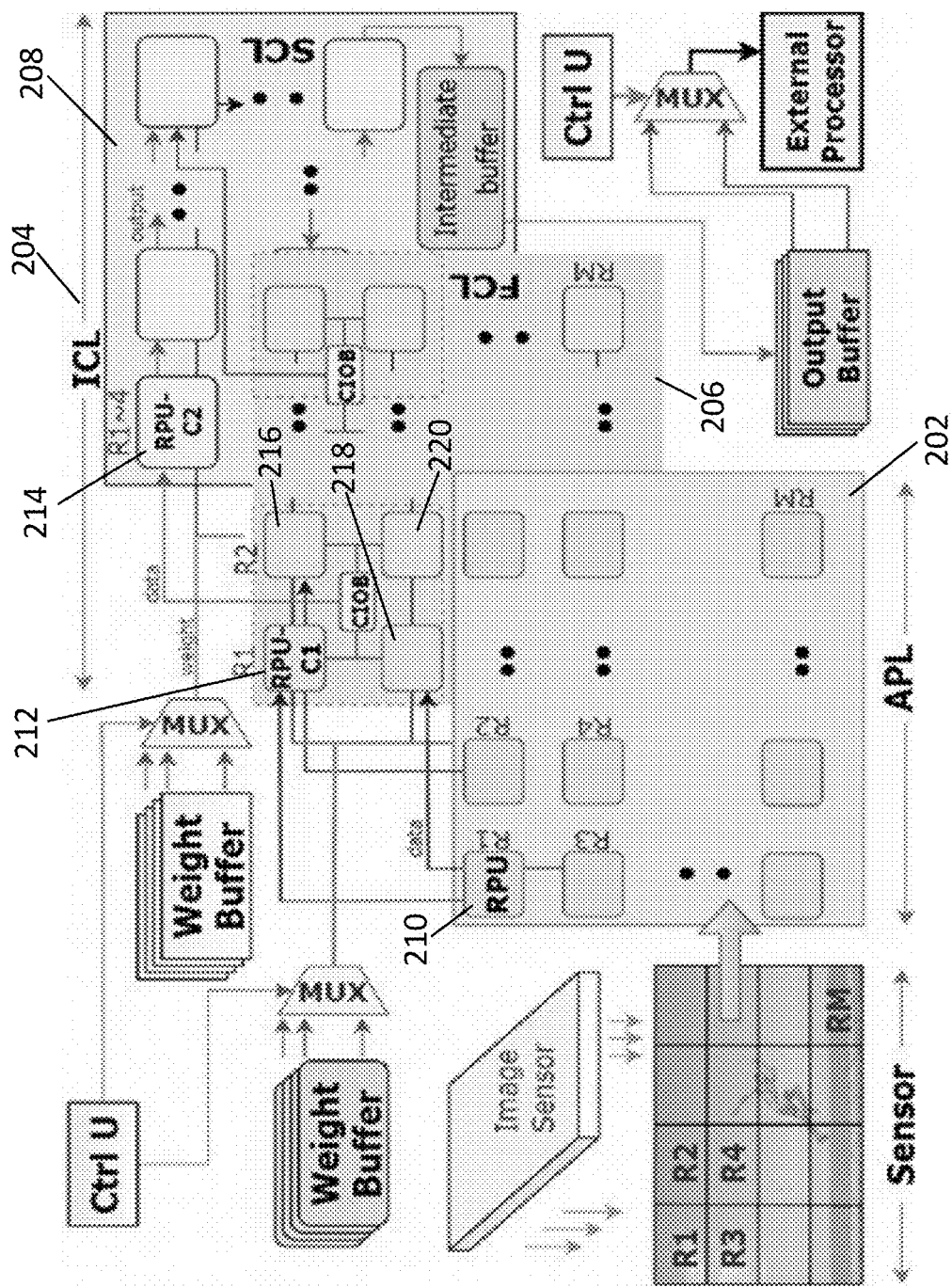
FIG. 2 shows a basic block diagram of an exemplary architecture for CNN integration at an image sensor, in accordance with one embodiment of the present disclosure.

FIG. 2 shows a basic block diagram of an exemplary architecture for CNN integration at an image sensor, in accordance with one embodiment of the present invention. The image sensor receives input light by its pixels, and stores corresponding light intensity values to a local register array to initiate parallel processing. Each image frame is divided into an M number of regions (R1, R2, R3, R4, . . . , RM) where each region has N pixels. The processing of an image frame can be performed in an Attention-Based Preprocessing Layer (APL) 202 and an Inference Computation Layer (ICL) 204. Each layer performs pixel-level and region-level processing with pixel processing unit (PPU) and region processing unit (RPU), respectively. The ICL 204 may have two sublayers: First Convolution Layer (FCL) 206 and Second Convolution Layer (SCL) 208. The APL and FCL may have an RPU for every region where the SCL may have an RPU for every four regions. These four regions may be spatially distributed in 2×2 form. For example, in FIG. 2, the top-left region processors RPU 210 in the APL 202 and RPU-C1 212 in the FCL 206 can be dedicated to the region R1. In the SCL layer 208, the top-left processor RPU-C2 214 handles four regions (R1-R4 regions) in the image frame. The detailed functionalities of every module are presented below.

Attention-Based Preprocessing Layer (APL)

Figure 3:
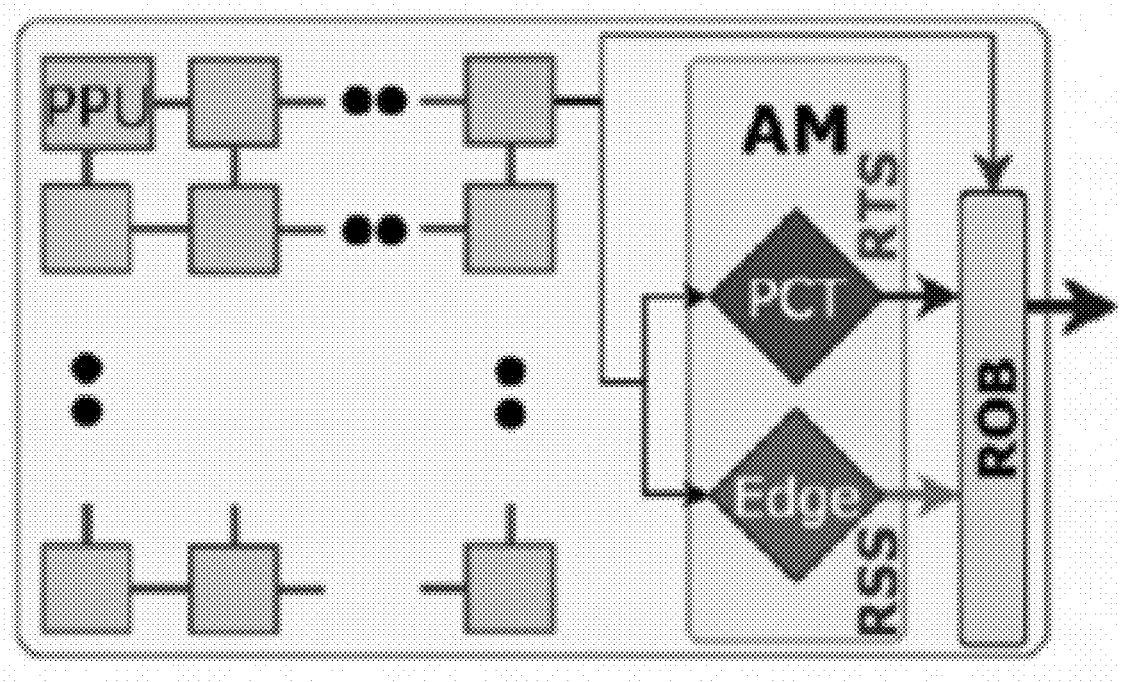
FIG. 3 is a block diagram of an exemplary implementation of a region processing unit (RPU) in an Attention-Based Preprocessing Layer (APL), in accordance with one embodiment of the present disclosure.

The APL is the first phase of the design and may have M identical RPUs as shown in FIG. 2 working in parallel. Each of the RPUs may be constituted of N similar pixel processing units (PPUs), i.e., each pixel is associated with a PPU. FIG. 3 depicts a block diagram of an exemplary implementation of an RPU in the APL. The RPUs in the APL collects pixels from the sensor in parallel, performs the low-level operation, and extracts features to calculate the saliences of corresponding regions. Only the relevant regions are combined with spatial filtering and transferred to the next layer of the hierarchy. Simultaneously, the APL keeps the processors in the hierarchy associated with redundant information inactive, which significantly saves dynamic power consumption. The novelty of this work is, instead of generating a salience map, the embodiments examine every region and investigate the relevance of that region in the image frame. This process takes less area than that of a circuit required for salience map generation. The entire operation has the following three steps.

Step 1. Image Acquisition

Figure 4:
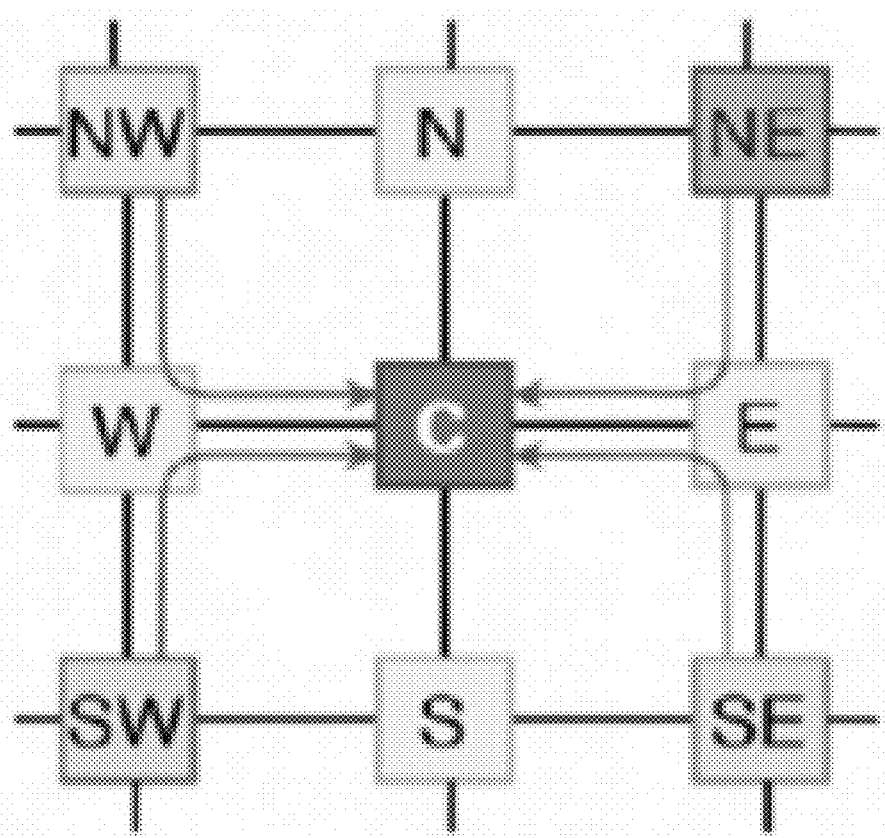
FIG. 4 is an exemplary image acquisition process in each pixel processing unit (PPU) at the APL, in accordance with one embodiment of the present disclosure.

FIG. 4 presents an exemplary image acquisition process in each PPU, in accordance with one embodiment of the present invention. In the embodiment, each PPU associated with a pixel receives its pixel value from the sensor directly, and may have direct connections with other PPUs associated with its neighboring pixels in the east, west, north, and south. For example, in FIG. 4, the PPU associated with the center pixel C may have direct connections with PPUs associated with the pixels in the east (E), west (W), north (N), and south (S) directions. In some embodiments, the PPU associated with the center pixel C may not have direct connection with the corner pixels NW, SW, NE, and SE. When the operations assigned to the PPU associated with the center pixel C require the neighboring pixel values in a 3×3 kernel, embodiments may use a unique and efficient model to obtain corner pixels. For example, in some embodiments, each PPU may act as an active forwarding module, and after receiving the pixel values from the direct connections, broadcast the values of the pixels to its north (N) and then south (S). As an example, shown in FIG. 4, when the PPU associated with the pixel W broadcasts the value of the pixel to its north, the PPU associated with the center pixel C receives the pixel value from the corner pixel NW. In this fashion, simultaneously, every PPU gets populated with the neighboring pixel in the APL. In other embodiments, the kernel size can be increased by performing additional broadcasting in some subsequent clock cycles. The unique data transfer method in the sensor completes the image acquisition, which is irrelevant to image size.

Step 2. Pixel-Parallel PPU Operation for Temporal and Spatial Salience

In some embodiments, after receiving the neighboring pixels, each PPU can start executing three separate functions in three different modules in parallel. The three modules are M0, M1, and M2, responsible for performing predictive coding in time (PCT), edge detection, and gaussian smoothing, respectively.

Figure 5:
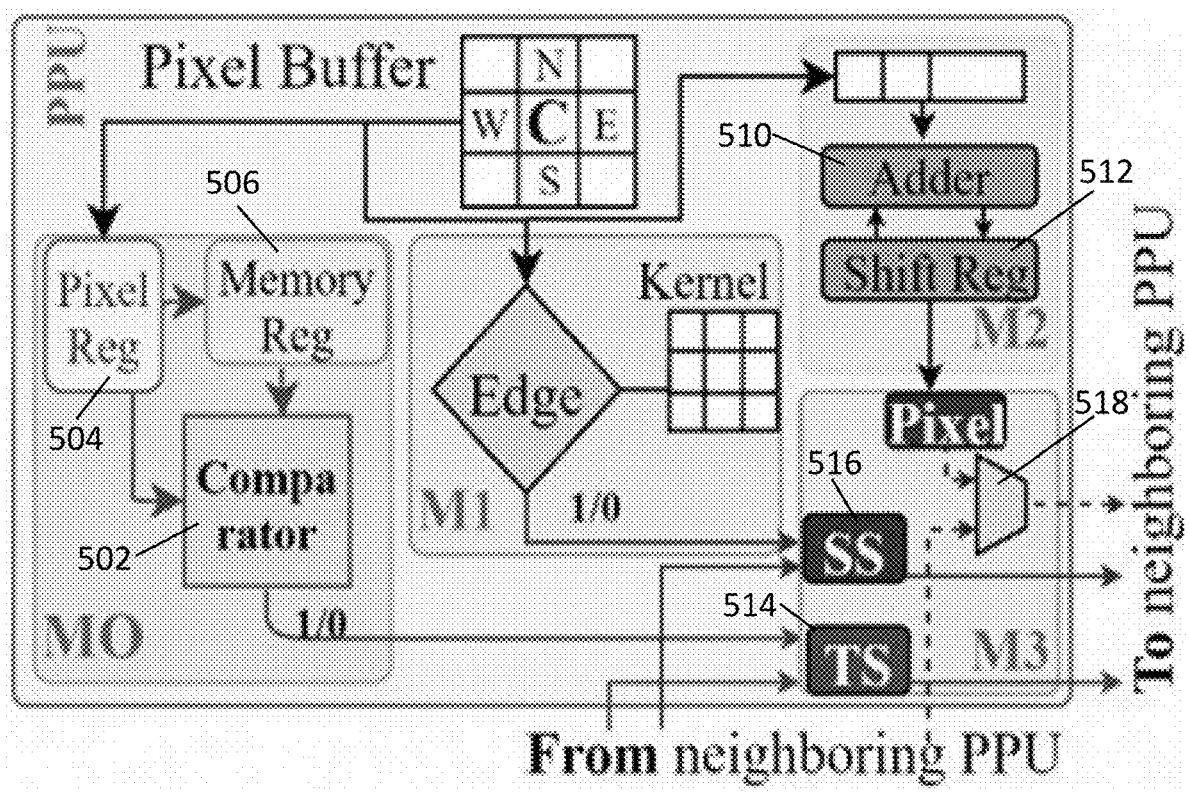
FIG. 5 is an exemplary functional block diagram of each PPU in the APL, in accordance with one embodiment of the present disclosure.

FIG. 5 illustrates an exemplary functional block diagram of each PPU in the APL, in accordance with one embodiment of the present invention. In the embodiment, all operations may be performed on a 3×3 kernel. The module M0 can predict the pixels in the 3×3 window for a corresponding pixel, for example the pixel C in FIG. 5, which can be done using predictive coding in time. The comparator 502 in M0 takes the inputs at the time t and t−1 from two register arrays 504, 506, respectively. The module M0 predicts the current pixel values from the pixel values at t−1. If there is no significant change observed between the predicted values and the values at the time t, then the embodiment considers there is no temporal change, and the comparator 502 generates a logic 0 as the value of temporal saliency (TS). Otherwise, the comparator 502 generates a logic 1 for significant temporal change.

The deployment of pixel-level attributes such as contrast, edge content, intensity bi-spectra, and color has been very well explored in salience literature. An identification analysis has shown that edge contents can successfully predict the regions where our visual attention fixates. Thus, some embodiments of the invention use an edge detection algorithm as a pixel-level attribute in the PPU to observe the spatial salience. The M1 module in each PPU (FIG. 5) preserves the edge detection mask and executes the operation. If the PPU stands on an edge, the module M1 gives a logic 1 as output and a logic 0 otherwise for spatial salience (SS). Hence, if the PPU of a pixel observes a temporal change and detects that the pixel stands on an edge, various embodiments of the invention may assume that the pixel does not have redundant information.

The module M2 in FIG. 5 can perform the Gaussian smoothing operation. Since the raw image is associated with noise, embodiments of the invention may perform smoothing before performing complex processing. Generally, a smoothing function has a certain number of addition and division operations, and the division is computationally expensive. Some embodiments of the invention can avoid the division operation with an adder and a shift register to save hardware cost. As shown in FIG. 5, an adder 510 in the module M2 first adds two pixel values, and then sends a result to a shift register 512. The shift register 512 shifts right the result by one bit and gives the shifted result to the adder 510 again. The adder 510 adds the shifted result with another pixel value and continues the process until all the kernel pixels are executed, and the final result is the smoothed pixel value for pixel C. The right-shift is analogous to division operation for the int8 data type. Hence, using an addition and shift operation, embodiments of the invention can perform the smoothing operation with less hardware cost. Since the operations are at the sensor, the architecture always concentrates on saving the area for every process.

Figure 6:
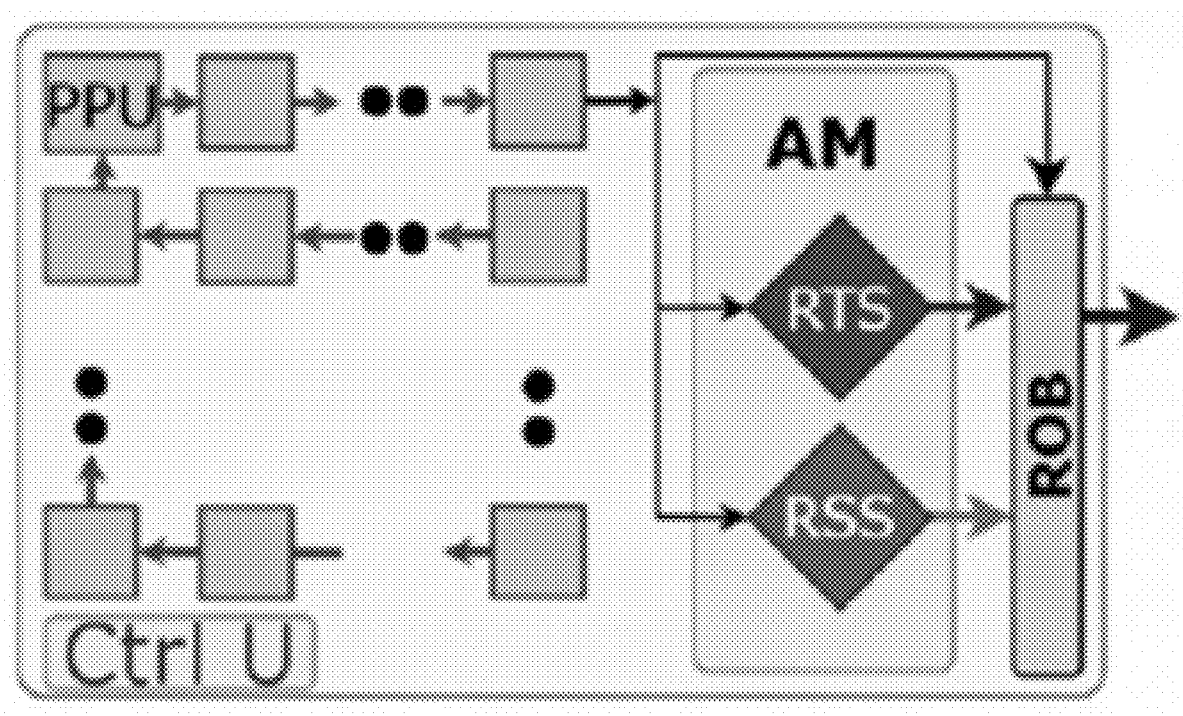
FIG. 6 is a block diagram of an exemplary data path for the propagation of the PPU output signals to a regional output buffer (ROB), in accordance with one embodiment of the present disclosure.

In some embodiments, when computations in the M0, M1, and M2 models are finished, the PPUs in each RPU can start propagating their output signals to an attention module (AM) and a regional output buffer (ROB). FIG. 6 presents a block diagram of an exemplary data path for the propagation of the PPU output signals to a regional output buffer (ROB), in accordance with one embodiment of the present invention. In FIG. 6, the output buffers of PPUs are serially connected and work as a scan chain-based shift register. In each cycle, the TS, SS, and smoothed pixel value sequentially go to their corresponding units. M3 module in FIG. 5 performs this operation by working as an active forwarding unit. The M3 module comprises three multiplexers 514, 516, and 518 for TS, SS, and smoothed pixel value. These multiplexers take their own signals and also signals from their preceding PPU in the series. Output signals of these multiplexers go to the M3 module of the next PPU. In this fashion, the M3 modules in the PPU array form a scan-chain type shift register. By controlling the multiplexers with a control unit (Ctrl-U), embodiments of the invention transfer data from N PPUs chronologically to the AM and ROB. Every PPU forwards the information, and the data forwarding takes N clock cycles. The benefits of this embodiment are that the system avoids the complex bus transfer protocol and reduces the number of interconnections among the modules.

Step 3. Region-Parallel RPU Operation for Relevance Checking in a Region

In some embodiments of the invention, each RPU is comprising N number of PPUs with an attention module (AM), as shown in FIG. 6. The RPU accumulates the pixel values after reducing noise from a region to a regional output buffer (ROB). Data is transferred to the next computational layer from this ROB.

In some embodiments, the output of the N PPUs in a region are connected in a serpentine way, as shown in FIG. 6, and requires N clock cycles to transfer all data from the N PPUs to the AM and the ROB. The AM can receive temporal and spatial saliencies from every PPU and then accumulate the data in every clock cycle with an adder. Adding the values of temporal saliencies and spatial saliencies from the N PPUs in the region respectively, the AM generates a regional temporal salience (RTS) and a regional spatial salience (RSS). The RSS or RTS is a logic 1 if the accumulated salience scores are higher than a threshold. The threshold value can be adjusted based at least in part on the mode of operation. If both the RSS and RTS are logic 1 for the region, the region is considered as a relevant region and further operations are performed on the relevant regions only. This design saves significant energy by halting the processing in irrelevant regions. Hence the energy consumption is a function of image feature.

The threshold value used to determine RSS or RTS may be an empirical value that can be adjusted for different scenarios. A high threshold value decreases the number of relevant regions (activated regions). However, it drops the accuracy of the method. This behavior is observed on the MNIST test dataset (10000 images), and Table 1 presents the analysis for this observation. Notably, it is not possible to test the temporal change in these datasets. Hence, only the spatial salience is considered. This analysis suggests that 50% regions can be truncated without losing any accuracy drop with a threshold value of 5. It varies in different datasets; and the Fashion MNIST dataset, for example, exhibits that 29% data volume can be removed without any accuracy drop where the threshold is 10. Note that, when the system works with real-time applications, the temporal change bears significant implications.

TABLE 1

Impact of the attention module threshold value (8 × 8 region size)

| Threshold Value | Avg. no. of irrelevant regions (out of 16) | Accuracy (%) |
|---|---|---|
| <5 | 8 | 98.8 |
| <10 | 10 | 97.9 |
| <15 | 11 | 93 |

In some embodiments of the invention, every region processor (or RPU) receives the corresponding RTS and RSS, and the impact of the RTS and RSS values on a corresponding region processor in the next layer is shown in Table 2. When both RTS and RSS are logic 1, the region is considered relevant, and the corresponding region processor in the next layer becomes active and gains control over the output of the region in the current layer. For other cases when the RTS and RSS values are not both at logic level "1", the corresponding region processor in the next layer remains inactive. However, the output of the processor in the next layer depends on the salience scores. When RTS is logic 0 and RSS is logic 1, the output of the processor in the next layer does not change though the processor is inactive. Because the region has relevant spatial information, but has temporal redundancies, the processor in the next layer should have performed computation at a preceding cycle. Hence, the processor can generate the output while skipping the computation, and the output is the same as the previous state of the processor. Alternately, if the RSS value is logic 0, which suggests that the region does not contain meaningful information, embodiments of the invention forcefully make the output of the corresponding processor in the next layer logic 0 (the RTS's value becomes do-not care state). This is because the computation on insignificant data cannot contribute to results. This strategy saves a significant amount of dynamic power consumption and shows how to obtain an output while bypassing the complicated execution procedure.

TABLE 2

Impact of salience score on the region processors in the next layer

| | | Impact on the Next Layer | |
|---|---|---|---|
| RTS | RSS | Region Processor | Output of the processor |
| 1 | 1 | Active | Driven by the processor |
| 1 | 0 | Inactive | Forced to zero |
| 0 | 1 | Inactive | Driven by previous state |
| 0 | 0 | Inactive | Forced to zero |

Inference Computation Layer (ICL)

In some embodiments, the functionalities of the ICL are divided into two sublayers-FCL and SCL (FIG. 2). The ICL is a computationally expensive layer, and some embodiments may vertically integrate it with the APL to keep area overhead lower in the pixel circuit. Each RPU from the APL may parallelly transfer data from the ROB to the corresponding region processor in the ICL through a vertical interconnect in the flip IC packaging architecture (FIG. 1).

Figure 7A:
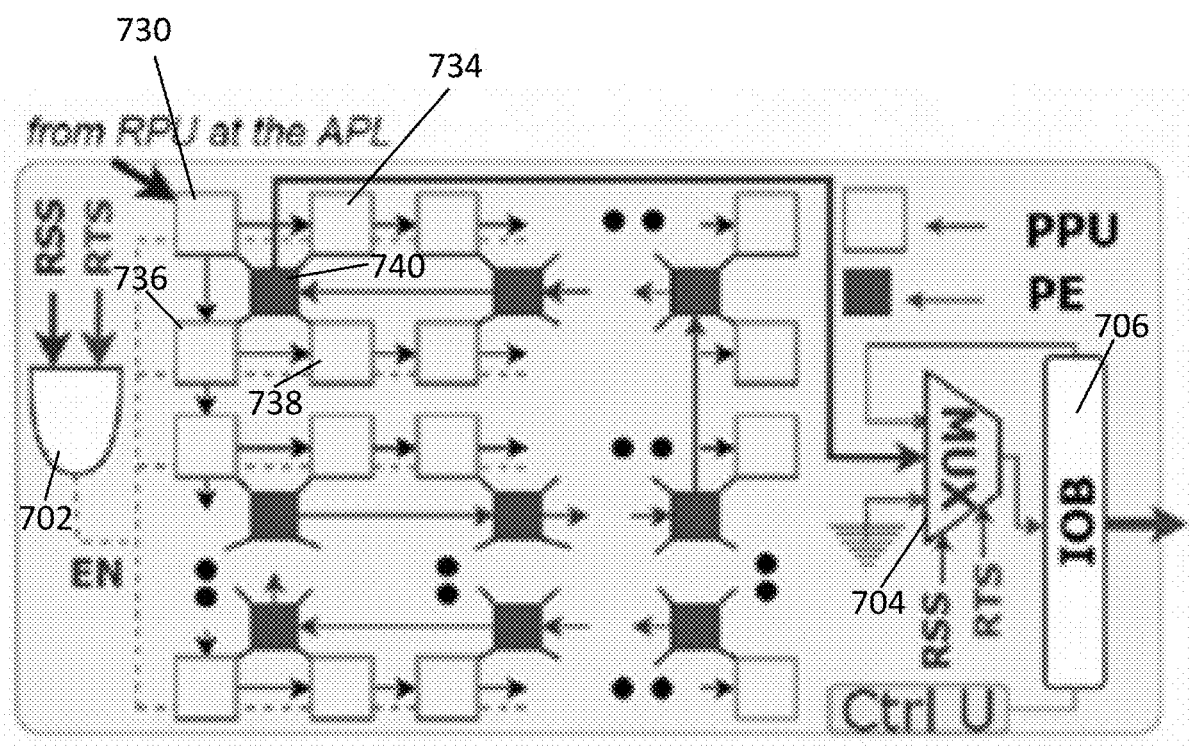
FIG. 7(a) shows an exemplary block diagram of each region processing unit in the first convolution layer (RPU-C1), in accordance with one embodiment of the present disclosure.
Figure 7B:
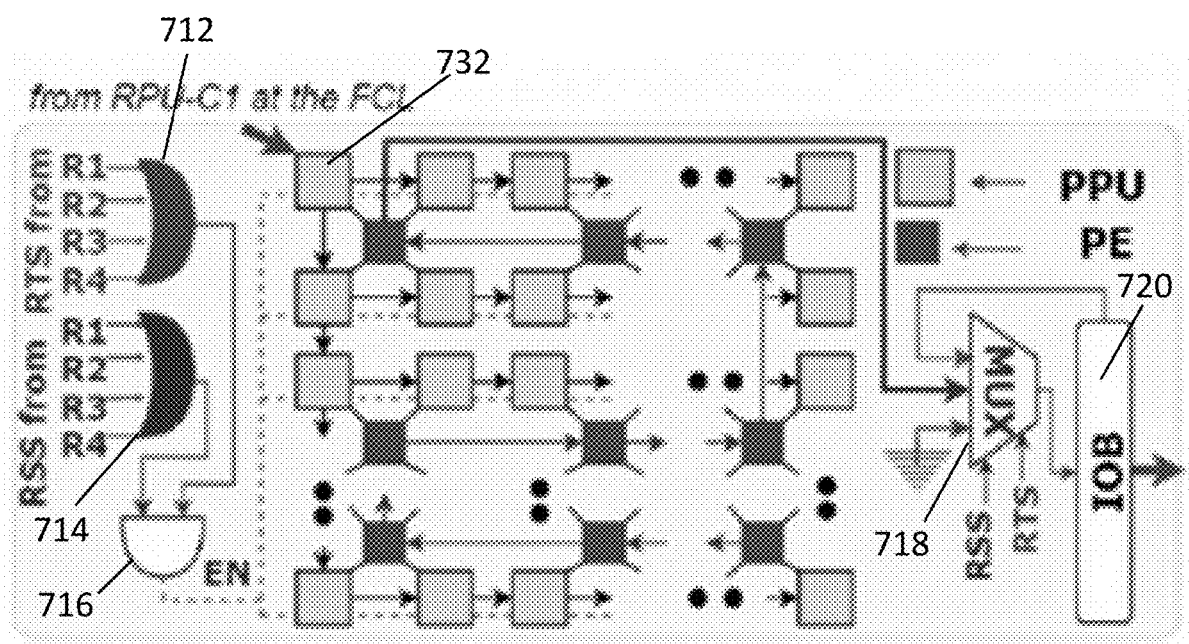
FIG. 7(b) shows an exemplary block diagram of each region processing unit in the second convolution layer (RPU-C2), in accordance with one embodiment of the present disclosure.

In FIG. 2, the example FCL and SCL layers are arranged in a 2-D array of RPU-C 1 and RPU-C2, respectively. FIGS. 7(a) and 7(b) show exemplary block diagrams of each RPU-C1 and RPU-C2, respectively. Like the APL, the FCL may comprise M RPU-C1, and each RPU-C1 may comprise N PPUs (FIG. 7(a)). Each RPU-C1 in the FCL corresponds to an RPU in the APL, and is associated with the same image region as that of the corresponding RPU in the APL. For every spatially distributed 2×2 RPU-C1s in the FCL, there may be one RPU-C2 in the SCL. The RPU-C2 in the SCL is associated with four image regions that the 2×2 RPU-C1s are associated with. The RPU-C2 receives data from four intermediate output buffers (IOBs) of the corresponding 2×2 RPU-C1s in the FCL. For example, in FIG. 2, the RPU-C2 214 receives data from the RPC-C1 212 and RPU-C1 216, 218, and 220. Thus, in some embodiments, the SCL may comprise M/4 RPU-C2s. The controller unit can directly manage the overlapping data and populate the buffer. In some embodiments, the RPU-C2 can also take the boundary data from intermediate output buffers of adjacent RPU-C1s. Communication between the RPC-C2 and RPU-C1s is described in more detail below with FIG. 9.

In some embodiments of the disclosure, as shown in FIG. 7, the RPU-C1/C2 can be enabled by the RSS and RTS signals. In FIG. 7(a), an AND gate 702 can receive the RSS and RTS signal from the corresponding RPU in the APL and generate an enable signal (EN) to drive the RPU-C1. If the EN is a logic 1, the RPU-C1 is activated. Otherwise, the RPU-C1 is kept inactive. A multiplexer 704 may receive the RSS and RTS signal as selectors and store an output data in an intermediate output buffer (IOB) 706. Conversely, in FIG. 7(b), the RPU-C2 represents the four regions (R1, R2, R3, and R4) in the original image frame. Two OR gates 712, 714 can be used to generate resultant RSS and RTS signals from the RSS and RTS values of the four regions. Then, an AND gate 716 can use the resultant RSS and RTS signals to generate an enable signal (EN) to drive the RPU-C2. Similar to the RPU-C1, the RPU-C2 is activated if the EN is a logic 1, and is kept inactive otherwise. This procedure ensures that if at least one region in the 2×2 kernel is relevant, the RPU-C2 becomes functional. In FIG. 7(b), a multiplexer 718 receives the resultant RSS and RTS signals as selectors and stores a corresponding output in an intermediate output buffer (IOB) 720. Table 2 summarizes the overall output from the RPU-C1/C2 for different RSS and RTS selector values. Besides these functionalities mentioned above, the RPU-C1 and RPU-C2 are the same in some embodiments. The basic features can be divided into the following three steps.

Step 1. Data Acquisition Process in PPU

In some embodiments, the data acquisition process can be depicted with black arrows in FIG. 7. For example, in FIG. 7(a), the first PPU 730 can receive the data stream from an ROB of the corresponding RPU at the APL and forward the stream among the PPU array in row-wise and column-wise directions. All PPUs in the first column can make the signal propagation in two directions. All PPUs in the last column do not propagate the signal, and the remaining PPUs may perform only row-wise propagation. Some embodiments of the invention parameterize every PPU with a unique id and insert a counter. Using the id and counter, these PPUs collect the pixels required to perform convolution operation. For instance, if the convolutional kernel has a dimension of p×q with r output channels, then each PPU acquires corresponding p×q pixels from the data stream to execute each channel in parallel. The method brings an improvement over data streaming with tag values or bus-based data propagation. If each pixel includes address bits as a tag, the width of the streaming interface increases. Then it requires more interconnecting channels between the APL and the ICL, and the vast number of interconnections is a design bottleneck for this architecture. Alternately, bus-based communications are power greedy and degrade the efficiency.

In some embodiments of the invention, the RPU-C1 can start receiving the streaming from the ROB of the RPU before the relevance of the corresponding region is calculated. These embodiments can hide the latency associated with image streaming. When the PPUs in the RPU-C1 fetch pixels, the AM of the corresponding RPU remains busy with calculating the relevance. If the AM finds the region is relevant, then the RPU-C1 can start executing because the RPU-C1 completes the data fetch prior to the relevance checking.

In some embodiments of the invention, data acquisition of the RPU-C2 at the SCL is similar to that of the RPU-C1 at the FCL except that the first PPU 732 in FIG. 7(b) receives the data stream from an IOB of a corresponding RPU-C1. In some embodiments, four RPU-C1s drive a RPU-C2, and thus the SCL may comprise M/4 RPU-C2s, where M is the number of RPU-C1s. Every RPU-C2 may comprise N PPUs (FIG. 7(b)), similar to the RPU-C1.

Step 2. Operations in the Processing Element (PE)

The computation of the ICL is expensive but straightforward. Some embodiments of the invention focus on obtaining high operating frequency from the design and minimizing the latency. Since the ICL circuits are not with the pixel circuit, thus silicon footprint is not as sensitive as the APL, and latency and power can get higher priority. The design can be complied with power effort high in the Design Compiler. In addition, buffers can be added to break the multiply accumulation (MAC) operation into several clock cycles to achieve high frequency.

In some embodiments of the invention, every PPU in the RPU-C1 and the RPU-C2 can fetch the corresponding p×q pixels from the data stream, and the time required to finish the acquisition process is different for every PPU. Whenever a PPU becomes populated with the corresponding p×q pixels, it generates a flag representing the PPU is ready for the convolution operation. In some embodiments, as shown in FIG. 7, there is a Processing Element (PE) for every four PPUs, and the PE becomes functional only when it receives at least one flag from the corresponding four PPUs. For example, in FIG. 7(a), PE 740 is associated with PPUs 730, 734, 736, and 738, and PE 740 becomes functional if it receives at least one flag from PPUs 730, 734, 736, and 738.

Figure 8:
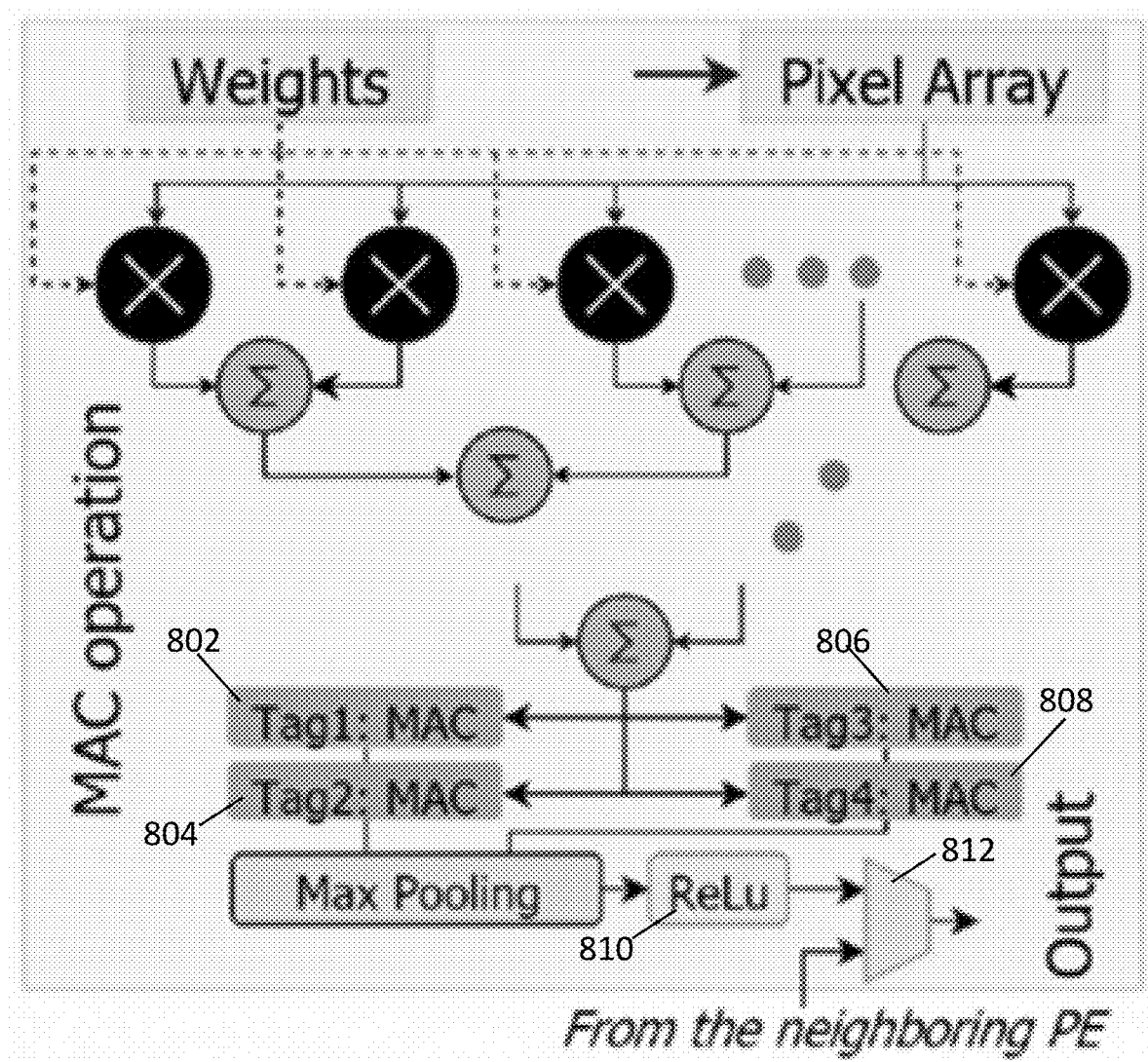
FIG. 8 is a block diagram of an exemplary processing element (PE) in the inference computation layer (ICL), in accordance with one embodiment of the present disclosure.

FIG. 8 shows a block diagram of an exemplary PE. A pixel array receives the p×q pixels in parallel from the PPU that generates the flag first. Some embodiments of the invention incorporate maximum parallelism in the PE by facilitating p×q MAC operations in parallel. The operands of the MAC operations can be signed 8-bit data, and 32-bit signed registers can be used to propagate the multiplication and addition results. The trained weights stored in the PE (or the RPU-C1/C2 comprising the PE) can be used in the multiplication of the MAC operation, which will be further described below. These embodiments can update the pixel array at four consecutive clock cycles by the pixel values of the four corresponding PPUs of the PE. After a particular time, the MAC operation's pipeline structure can give output in four consecutive clock cycles. The 32-bit output after each MAC operation can be quantized to 8-bit and stored to one of the four registers 802, 804, 806, and 808, which are separated by tag values. Max pooling function can be applied to the four registers to obtain the maximum intensity from the output of the four MAC operations. After the max pooling, the maximum value can be sent to a rectified linear unit (ReLu) 810. The ReLu generally involves the sigmoid function, which is expensive in hardware. In some embodiment of the invention, the ReLu 810 can include non-linearity by suppressing negative values and passing only positive values to subsequent layers. This simplified function in the ReLu 810 reduces the hardware costs.

In some embodiments of the invention, each PPU needs to fetch p×q pixels, and four PPUs (spatially distributed in 2×2 form) corresponding to a PE exhibit a lot of common pixels. The registers in the PPU do not waste resources to store the common pixels. Instead, in every 2×2 PPU group, the PPUs can share the common pixels with others to save hardware costs.

The CNN operation can involve a vast number of MAC operations with high dimensional weights. Some embodiments of the invention can save resources in the RPU-C (RPU-C1 or RPU-C2) by storing the minimum number of weights p×q in a local weight buffer (LWB) to generate partial data by executing one channel. The PE can use the weights in the multiplication operation. Right after the multiplications, the LWB can reload the weights from a global weight buffer (GWB) to initiate another batch of MAC operation for the next channel. The iteration number depends on the number of channels of the weights. For example, if the weight dimension is p×q with r channels, these embodiments can iterate the MAC operation r-times by updating the weights. Each iteration produces a partial result from one channel. After finishing the multiplication in the MAC operation, the RPU-C can start updating the p×q weights from the GWB, which requires p×q clock cycles and do not require off-chip communication. When these embodiments update weights in the LWB of the RPU-C, the RPU-C can complete the remaining operation assigned to the FCL or SCL. In some embodiments, these RPU-Cs can be weight configurable and initialized with weights before the execution starts.

In some embodiments of the invention, the PE can also act as an active forwarding unit like the PPU in the APL layer. Similar to the data path of the PPUs in the APL layer as shown in FIG. 6, a serpentine connection can connect all PEs in the RPU-C1 or the RPU-C2 to propagate their output, as shown in FIG. 7. In some embodiments, every PE can receive the output of its previous PE and forward it to the next PE. As shown in FIG. 8, a multiplexer 812 can couple the output from the ReLu 810 or the output of a previous PE to the output of the PE. In this manner, these embodiments form a shift register where the initial content of each register can be the output of the corresponding PE. The multiplexer 812 of each PE keeps its own output in the register at the first clock cycle, and then these values shift in every following clock cycle towards the IOB 706/720 in FIG. 7. To achieve this, the selector of the multiplexer 812 can be a logic 0 at the first cycle and remain a logic 1 to shift data for the following clock cycles until output of all PEs in the RPU-C1 or the RPU-C2 are propagated to the IOB 706 or 720 respectively. The data path is shown in FIG. 7 (highlighted with red arrowed lines).

Step 3. Communication Between the FCL and SCL

In some embodiments of the invention, both the RPU-C1 and RPU-C2 can have an intermediate output buffer (JOB) that stores the streaming output from the PEs chronologically (FIG. 7). After every iteration, the values of PEs in the corresponding IOB can be partial data. The structures of the IOBs in the first convolution and second convolution layers can be different. For example, in the FCL, the IOB can transfer the stored partial data to the SCL, and the new partial data can replace the old values. And the IOB in the SCL can chronologically accumulate the new data with the ones received previously. In some embodiments, the number of iterations in the FCL and SCL can be different. For example, assume that the weights are p×q with r output channels in the FCL and s output channels in the SCL. The same operation iterates r and (r×s) times in the RPU-C1 at the FCL and RPU-C2 at the SCL, respectively. The controller unit (Ctrl-U) in each RPU-C1 and RPU-C2 maintains signaling associated with the iteration.

Figure 9:
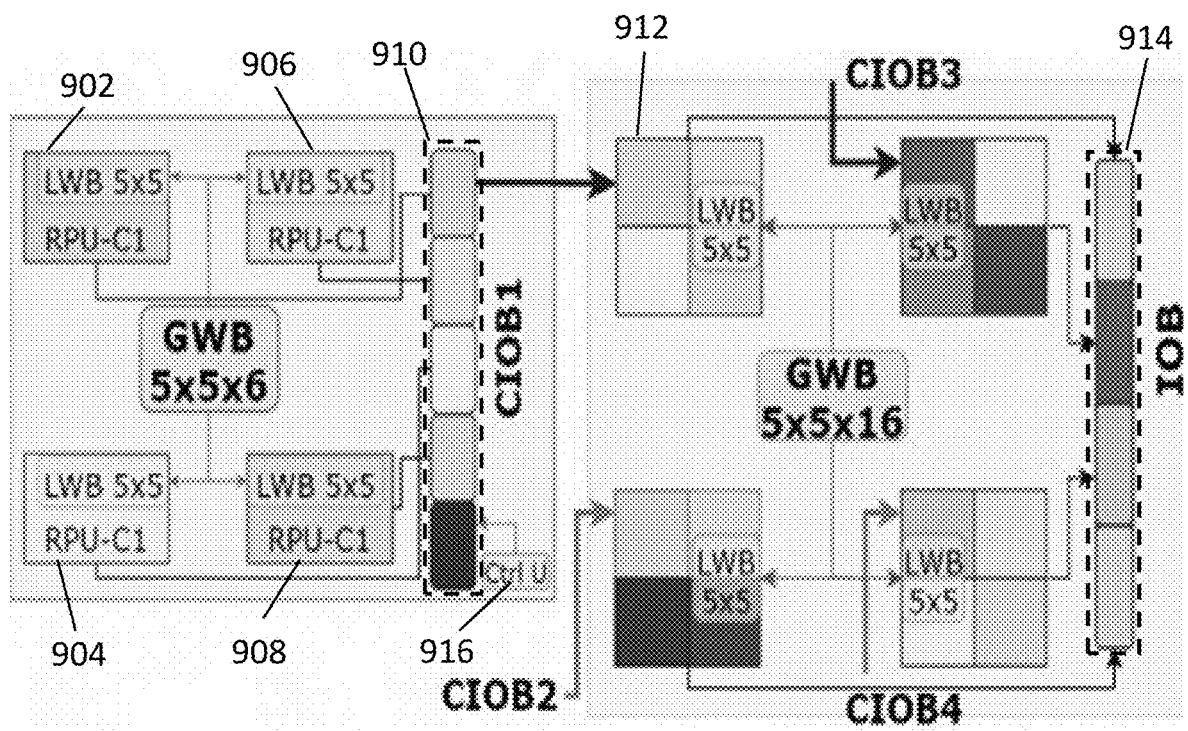
FIG. 9 illustrates an exemplary communication between an exemplary first convolution layer (FCL) and an exemplary second convolution layer (SCL), in accordance with one embodiment of the present disclosure.

FIG. 9 shows an exemplary communication between an example FCL and an example SCL. In the FCL layer, four IOBs of four RPU-C1s 902, 904, 906, and 908 form a cluster intermediate output buffer (CIOB) 910, and an RPU-C2 912 takes data from the CIOB 910. The cluster may include the overlapping data of two regions and zero paddings for the regions at the edge. A control unit 916 can accumulate the overlapping and associated zero paddings (if required) values and integrate them in the CIOB. A RPU-C2 at the SCL can receive data that streams from the corresponding CIOB in the FSL. Note that the data streamed from the CIOB buffer in the FSL also comprises the boundary values for the next RPU-C2. The output from a CIOB 914 in the SCL can then be serially transferred to a fully connected layer. In the fully connected layer, the sequential MAC operation can be performed on a low power embedded processor.

In some embodiments of the invention, a control unit (Ctrl-U) can be responsible for maintaining the coherency between different layers in the architecture. The control unit can act as a custom scheduler that keeps track of the output feature maps in the FCL and SCL and govern data flow in each layer. For example, assume the FCL and SCL have the weight dimensions of 5×5, with output channels of 6 and 16, respectively. Every RPU-C1 can first compute 5×5 MAC operations and send output to an intermediate output buffer (JOB). As shown in FIG. 9 and FIG. 2, four IOBs of four RPU-C1s in 2×2 block forms a clustered IOB (CIOB). Data streams from the CIOB can populate the corresponding RPU-C2 in the SCL. The RPU-C2 can also perform 5×5 MAC operations, and its IOB collects the partial feature data. The process can iterate 16-times in the RPU-C2 to produce a set of partial results. After that, the Ctrl-U can instruct the four RPU-C1s in the FCL to generate another feature map, and the corresponding RPU-C2 in the SCL can again iterate 16-times and the IOB of the RPU-C2 accumulates these partial results with the previous partial data. The Ctrl-U can repeat this process 6 times. After all these accumulations in the IOB of RPU-C2, embodiments can get the complete feature map and transfer it sequentially to an embedded processor where a fully connected neural network layer can be implemented. Then the Ctrl-U can instruct to re-initialize the next image frame.

In some embodiments of the invention, instead of an embedded processor, other alternatives such as FPGA and custom processors can be used. The FCL and SCL give huge speedup, and the attention-based strategy reduces redundant regions. These steps reduce the data volume in the fully connected layer and expedite the overall processing to generate output in real-time on the edge device.

Figure 10:
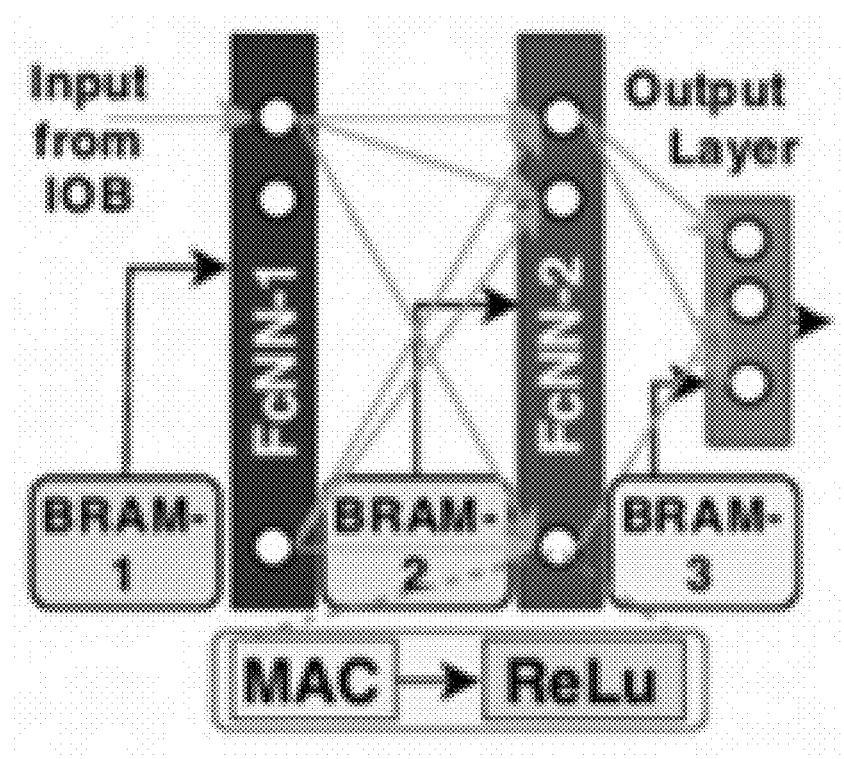
FIG. 10 is an exemplary implementation of a fully connected neural network layer, in accordance with one embodiment of the present disclosure.

Some embodiments of the invention may comprise a fully-connected neural network layer (FcNN). The configuration of the FcNN can be different for different datasets and machine learning models. Hence, in some embodiments, an off-chip implementation of the FcNN can be used. In one embodiment, an exemplary architecture of the FcNN can be implemented on a Field Programmable Gate Array (FPGA). The extracted features from the convolutional layers (or ICL layers) can be fed to the FcNN computation module to carry out the remaining computation. The benefit of using a reconfigurable platform, such as an FPGA, is it is possible to configure the FcNN by adding or deleting layers or change the number of MAC units in each layer. In some embodiments, the FcNN can have multiple fully connected layers followed by an output layer. For example, in FIG. 10, the FcNN has two fully connected layers (FcNN-1 and FcNN-2) followed by a softmax output layer. The FcNN-1 may have W MAC units, which is equal to the number of features produced after finishing the convolution operation. The FcNN-1 generates U features and FcNN-2 receives the U features and produce V features with U MAC units. Finally, the soft-max output layer produces the output with V numbers of MAC units. In some embodiments, every MAC unit is followed by a ReLu. Each layer in the FcNN can update weights in all MAC units from their on-chip memory (BRAM) at every clock cycle. The pipeline execution expedites the massive number of convolutions in the FcNN. In some embodiments, the layers in the FcNN are scalable and configurable to produce the desired number of MAC operations.

Attention-Based Training for the ICL

In some embodiments of the invention, the weights used in the ICL layer for CNN inference can be trained only on the attention-based relevant data instead of the entire image. ICL operates on the data coming from the relevant regions. Therefore, it can be plausible to focus the training of the CNNs only on the relevant data extracted by the APL. The primary task of the initial convolutional layer of a CNN is to learn feature representation. CNN models perform feature learning and classification simultaneously. The feature representations are treated as different knowledge of the incoming data. The classification/detection performance of CNNs depends on their capability to learn the abstract and comprehensive feature representations through the training process. The usual approach is to develop sufficiently deep networks and then train them with large-scale datasets. However, training very deep CNNs can be resource and time-consuming. As can be understood, the models trained on traditional image datasets often do not consider spatial and temporal redundancies found in the natural images. To facilitate the behavior of the APL during the training procedure, an additional computation layer (attention layer) is considered that precedes the regular convolution layer. The attention layer emulates the behavior of the APL and draws attention for each frame. In some embodiments, supervised training is performed in the training procedure, and the CNN weights are updated using stochastic gradient descent. In some embodiments, during backpropagation, only the weights of the convolutional layers are updated, and the attention layer may not be affected by it.

Two benefits can be achieved by using the attention-based training. First, the CNN model converges faster compared to the traditional training process. This is because, during the training process, the model learns the feature points of relevant objects. By cross-validating a large-scale dataset, the model becomes competent in differentiating relevant feature points from irrelevant ones and starts discarding irrelevant data. With the assistance of the attention layer, the feature points from the non-relevant background regions can be pre-eliminated before being passed through the CNN model. The mechanism ensures that the CNN model does not waste computation on learning non-relevant information. Second, the attention layer can be detached from the CNN layer and does not have computational dependencies. Therefore, by passing the traditional dataset through the attention layer, it is possible to reduce the data volume of the training dataset. The output of the attention layer does not contain redundant data, which can be of high percentage in many datasets. By eliminating the redundant information, the procedure can reduce the storage requirement for the training data volume considerably.

CONCLUSION

Various embodiments of the disclosure represent an architecture and a method that enable CNN operation close to the image sensor. Many modifications and other embodiments of the disclosures set forth herein will come to mind to one skilled in the art to which these disclosures pertain having the benefit of the teachings presented in the foregoing description and the associated drawings. Therefore, it is to be understood that the disclosures are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. A digital image capturing and processing system comprising:
an image sensor comprising a plurality of regions, wherein (a) each of the plurality of regions comprises a plurality of pixels, and (b) each of the plurality of pixels is configured to produce a digital pixel value representative of an intensity of the corresponding pixel in an image; and
a plurality of processing layers comprising an attention-based preprocessing layer, at least one inference computation layer, and at least one fully connected layer, wherein:
the attention-based preprocessing layer comprises a first plurality of region processing units, wherein each of the first plurality of region processing units is associated with one of the plurality of regions, configured to determine whether the corresponding region is a relevant region based at least in part on digital pixel values produced by a plurality of pixels in the region,
the at least one inference computation layer comprises a second plurality of region processing units, wherein the second plurality of region processing units are configured to generate a complete feature map of the image, and
the at least one fully connected layer comprises a processing unit, wherein the processing unit of the at least one fully connected layer is configured to process the complete feature map of the image.

2. The digital image capturing and processing system of claim 1, wherein the first plurality of region processing units are configured to operate in parallel.

3. The digital image capturing and processing system of claim 1, wherein each of the first plurality of region processing units comprises a plurality of pixel processing units, wherein each of the plurality of pixel processing units is associated with a pixel of the image sensor.

4. The digital image capturing and processing system of claim 3, wherein each of the first plurality of region processing units comprises an attention module, the attention module is configured to determine whether a corresponding region is a relevant region based at least in part on values of temporal saliencies and spatial saliencies from a plurality of pixels disposed in the region.

5. The digital image capturing and processing system of claim 4, wherein a plurality of pixel processing units associated with the plurality of pixels disposed in the region are configured to determine the values of temporal saliencies and spatial saliencies.

6. The digital image capturing and processing system of claim 4, wherein the values of temporal saliencies and spatial saliencies are determined using predictive coding in time and edge detection respectively.

7. The digital image capturing and processing system of claim 1, wherein the at least one inference computation layer comprises a first convolution layer (FCL) and a second convolution layer (SCL), wherein the FCL comprises a third plurality of region processing units, each of the third plurality of region processing units is associated with one of the plurality of regions, the third plurality of region processing units are configured to operate in parallel, and wherein the SCL comprise a fourth plurality of region processing units, each of the fourth plurality of region processing units is associated with multiple regions of the plurality of regions, the fourth plurality of region processing units are configured to operate in parallel.

8. The digital image capturing and processing system of claim 7, wherein each of the fourth plurality of region processing units is associated with four regions of the plurality of regions.

9. The digital image capturing and processing system of claim 7, wherein an operation of each of the third plurality of region processing units is determined based at least in part on whether a region the corresponding region processing unit is associated with is a relevant region.

10. The digital image capturing and processing system of claim 7, wherein an operation of each of the fourth plurality of region processing units is determined based at least in part on whether at least one of the multiple regions the corresponding region processing unit is associated with is a relevant region.

11. A method of digital image capturing and processing comprising:
   generating, by an image sensor, digital pixel values of an image, wherein the image comprises a plurality of regions and each region comprises a plurality of pixel values;
   determining, by a first plurality of region processing units, whether each of the plurality of regions is a relevant region, wherein each of the first plurality of region processing units is associated with one of the plurality of regions, configured to determine whether the corresponding region is a relevant region based at least in part on a plurality of pixel values associated with the region;
   generating, by a second plurality of region processing units, a complete feature map of the image; and
   processing, by a processing unit, the complete feature map of the image.

12. The method of claim 11, wherein the first plurality of region processing units are configured to operate in parallel.

13. The method of claim 11, wherein each of the first plurality of region processing units comprises a plurality of pixel processing units, wherein each of the plurality of pixel processing units is configured to process one of a plurality of pixel values in a region associated with the corresponding region processing unit.

14. The method of claim 13, wherein each of the first plurality of region processing units comprises an attention module, the attention module is configured to determine whether a corresponding region is a relevant region based at least in part on values of temporal saliencies and spatial saliencies from a plurality of pixel values in the region.

15. The method of claim 14, wherein a plurality of pixel processing units associated with the corresponding region processing unit are configured to determine the values of temporal saliencies and spatial saliencies in the corresponding region.

16. The method of claim 14, wherein the values of temporal saliencies and spatial saliencies are determined using predictive coding in time and edge detection respectively.

17. The method of claim 11, wherein the second plurality of region processing units comprises a third plurality of region processing units and a fourth plurality of region processing units, wherein each of the third plurality of region processing units is associated with one of the plurality of regions, the third plurality of region processing units are configured to operate in parallel, and each of the fourth plurality of region processing units is associated with multiple regions of the plurality of regions, the fourth plurality of region processing units are configured to operate in parallel.

18. The method of claim 17, wherein each of the fourth plurality of region processing units is associated with four regions of the plurality of regions.

19. The method of claim 17, wherein an operation of each of the third plurality of region processing units is determined based at least in part on whether a region the corresponding region processing unit is associated with is a relevant region.

20. The method of claim 17, wherein an operation of each of the fourth plurality of region processing units is determined based at least in part on whether at least one of the multiple regions the corresponding region processing unit is associated with is a relevant region.

* * * * *